(12) United States Patent
Nieuwenhuizen

(10) Patent No.: US 9,995,279 B2
(45) Date of Patent: Jun. 12, 2018

(54) WIND TURBINE BLADE, WIND TURBINE AND METHOD FOR MANUFACTURING A WIND TURBINE BLADE

(71) Applicant: Vestas Wind Systems A/S, Aarhus (DK)

(72) Inventor: John Johannes Mathias Hubertus Nieuwenhuizen, Horsens (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 687 days.

(21) Appl. No.: 13/709,871

(22) Filed: Dec. 10, 2012

(65) Prior Publication Data

US 2013/0101415 A1 Apr. 25, 2013

Related U.S. Application Data

(63) Continuation of application No. 12/739,268, filed as application No. PCT/DK2008/000375 on Oct. 24, 2008, now abandoned.

(30) Foreign Application Priority Data

Oct. 24, 2007 (DK) .................................. 2007-01527

(51) Int. Cl.

| F03D 1/00 | (2006.01) |
|---|---|
| F03D 9/00 | (2016.01) |
| F03D 1/06 | (2006.01) |
| B23P 15/04 | (2006.01) |
| F03D 80/00 | (2016.01) |
| F03D 80/30 | (2016.01) |
| F03D 9/25 | (2016.01) |

(52) U.S. Cl.
CPC .............. *F03D 9/002* (2013.01); *B23P 15/04* (2013.01); *F03D 1/065* (2013.01); *F03D 9/25* (2016.05); *F03D 80/00* (2016.05); *F03D 80/30* (2016.05); *F05B 2260/80* (2013.01); *Y02E 10/721* (2013.01); *Y02E 10/726* (2013.01); *Y02P 70/523* (2015.11); *Y10T 29/49337* (2015.01)

(58) Field of Classification Search
CPC ........ F03D 1/0675; F03D 17/00; F03D 80/00; F05B 2260/80; Y10T 29/49337
See application file for complete search history.

(56) References Cited

U.S. PATENT DOCUMENTS

| 6,940,186 B2* | 9/2005 | Weitkamp | F03D 7/042 |
| | | | 290/44 |
| 7,040,864 B2* | 5/2006 | Johansen et al. | 416/146 R |
| 7,348,683 B2* | 3/2008 | Riesberg | 290/1 R |
| 7,549,803 B2* | 6/2009 | Thompson et al. | 385/88 |
| 7,590,496 B2* | 9/2009 | Blemel | F17D 5/02 |
| | | | 702/35 |
| 7,726,942 B2* | 6/2010 | Mortensen et al. | 416/5 |
| 7,844,154 B2* | 11/2010 | Bookbinder | G02B 6/02047 |
| | | | 385/123 |

* cited by examiner

*Primary Examiner* — Ninh H Nguyen
(74) *Attorney, Agent, or Firm* — Patterson + Sheridan, LLP

(57) ABSTRACT

A wind turbine blade includes one or more electric powered modules powered by light beams so as to provide a galvanic separation between the electric powered modules and a lightning protection system in a wind turbine blade. The modules have a power supply converting an energy source in the form of light beams to electrical power for the one or more modules. A wind turbine and a method for manufacturing a wind turbine blade are also disclosed.

17 Claims, 6 Drawing Sheets

WIND TURBINE BLADE, WIND TURBINE AND METHOD FOR MANUFACTURING A WIND TURBINE BLADE

CROSS-REFERENCE TO RELATED APPLICATIONS

This application is a continuation of U.S. application Ser. No. 12/739,268, filed Apr. 22, 2010, which is the National Stage of International Application No. PCT/DK2008/000375, filed Oct. 24, 2008, and claims priority under 35 U.S.C. § 119(e) to Danish Patent Application No. PA 2007-01527, filed Oct. 24, 2007. The subject matter of each of the foregoing applications is hereby incorporated herein by reference in its entirety.

BACKGROUND OF THE INVENTION

The invention relates to a wind turbine blade, wind turbine and a method for manufacturing a wind turbine blade.

Modern wind turbine blades hold different apparatuses in order to survey and protect the blades from overload and damage such as sensor means. The sensor means are usually externally supplied with electrical power via electrical cables running through the interior of the blade.

Wind turbine blades may also comprise a lightning protection system which usually includes a number of lightning receptors, e.g., on the blade tip surface and with connections to a lightning down conductor. The lightning down conductor runs through the interior of the blade and via other parts of the wind turbine to a ground potential.

A problem with the use of internal electrical cables for sensors and a lightning protection system in the wind turbine blade is the risk of lightning current following the electrical cables to a ground potential instead of the down conductor after a lightning flashover.

Even if a flashover does not occur when the lightning strikes the wind turbine blade, another problem may arise by the electromagnetic interference between the lightning down conductor and the sensor systems.

The result of the abovementioned lightning situations may be time consuming and costly repair of the sensor systems.

The object of the invention is to establish a wind turbine blade having electrically powered means having less vulnerability to lightning strikes on the blade.

SUMMARY OF THE INVENTION

The invention relates to a wind turbine blade comprising one or more electric powered modules and power supply means converting an energy source to electrical power for the one or more modules, wherein the energy source is light beams transmitted to the power supply means in the blade structure and/or interior from an internal light source.

In this regard, a galvanic separation may be established between the electric power modules and any electric ground potential by using light beams as the energy source and converting the energy source locally at the modules to electric power. The lightning current will thus not affect or damage the electric powered modules due to the galvanic separation.

In an aspect of the invention, the electric powered modules are one or more sensor modules, e.g., for sensing strain, vibrations, lightning strikes, surface deposits of ice, dirt etc. and/or other types of condition monitoring sensor modules in the blade. In this manner, a reliable power supply may be provided to electric powered modules which need to be of a physically small size in order to be implemented into the blade structure and/or fit into restricted parts of blade interior such as the blade tip. The sensor modules would otherwise be very difficult to protect against the effects of the lightning current without increasing the size of the modules significantly and thus be restricted in the positioning of the sensor modules within the blade. Further, it is possible in an advantageous manner to implement a high degree of sensor "intelligence" in the wind turbine blade.

In another aspect of the invention, the one or more electric powered modules are integrated in the blade structure, e.g., EMC protected with a surrounding electrically conductive mesh or casing. In this manner, the possibility of obtaining better positions for accurate and fast sensing of blade values is provided, e.g., instead of using indirect sensing via sensor interfaces on the inner surface of the blade. The protection of the modules against electromagnetic interference further validates the sensed values in an advantageous manner.

In a further aspect of the invention, the one or more electric powered modules are connected to the hub and/or nacelle via at least one optical fibre, e.g., as part of or in connection with an external optical data communication for the modules. In this manner, a significant non-electrical conducting distance may be provided to establish a guaranteed galvanic separation between the electric powered modules and further means. The further means may include the light source, and any receiving means for the data communication of the modules.

In an even further aspect of the invention, the optical fibre may be understood as glass or plastic that carries light along its length. The optical fiber may also sometimes be referred to as a optical waveguide, light guide or fiber optical cable and even a hollow tube with a reflective inner surface.

In an even further and advantageous aspect of the invention, the use of light guides increases the communication speed compared to cables with conductors of, e.g., aluminum or copper. Furthermore, the use of light guides enables more than one communication channel within the same fibre and even makes bidirectional full duplex communication possible.

In an even further and advantageous aspect of the invention, the use of light guides ensures long lasting use and small dimensions compared to cables with conductors of, e.g., aluminum or copper.

In an even further aspect of the invention, the power supply means of the one or more electric powered modules comprise(s) at least one photovoltaic cell for converting light beams to electrical power and/or storage means for storing the electrical power such as one or more capacitors, e.g., very high capacity capacitors.

In this manner, an advantageous embodiment of the power supply in the electric powered module may be provided. Specifically, a dependable power supply may be provided for local conversion of non-electrical energy to electric power and preferably includes subsequent energy storage in an exemplary form of space efficient capacitors.

In an aspect of the invention, the at least one photovoltaic cell receives light beams from the at least one optical fibre, e.g., at least one fibre dedicated to the power supply means or at least one fibre for energy transmission and data communication in combination. Hereby, it is possible to transmit the light beams via a separate power optical fibre and hereby establishing a power supply solution with an increased reliability and flexibility. Further, it is possible to use the data communication fibres for energy transmission, e.g., in defined time periods in order to establish a module system with a simple power and data communication connection to the exterior of the blade.

In another aspect of the invention, the power supply means is combined with further energy sources such as one or more solar cells disposed on the blade surface or the one or more solar cells integrated in the blade structure beneath a fully or partly transparent cover material. The power supply means may be combined together or separately with other energy sources, for example, kinetic energy sources and/or electromagnetic energy sources in the blade. In this manner, at least one advantageous way may be utilized to supplement the power (light) supplied from the external light source with electric power.

In a further aspect of the invention, the one or more electric powered modules are positioned in the outer half of the wind turbine blade and preferably in proximity of the tip of the wind turbine blade. In this manner, an advantageous galvanic protection may be established to protect the electric powered modules in a part of the blade having small dimensions and where lightning often strikes. In this part of the blade having small dimensions, the galvanic separation may provide protection from an increased risk of lightning flashovers as the modules are positioned in close range of the lightning down conductor and the lighting receptors. It should be noted that the location of the one or more electric powered modules does not influence their operation or function. In other words, the one or more electric powered modules may operate just as well when located near the root or the tip of the blade.

In an even further aspect of the invention, the one or more electric powered modules comprise microprocessor means such as ultra low power microprocessor means and/or coupling means for a cascade coupling of energy source/data communication to further couple electric powered modules. In this manner, an electric powered module may be provided which may be operated and function perfectly with the low amount of power that can be transmitted from the external light source. Further, the cascade coupling allows multiple modules to be connected in relation to data communication as well as power transmission, e.g., in order to minimize the number of optical fibres necessary in or within the wind turbine blade.

Having more than one optical fibre may provide a redundancy to the system, which is preferable because it is difficult to replace damaged optical fibres in the wind turbine blade.

According to an aspect of the invention, it is preferred to use optical fibres of the single-mode type, but multi-mode optical fibres may also be used. Optical fibres of the single-mode type may be preferred because it, unlike multi-mode optical fibers, does not exhibit modal dispersion resulting from multiple spatial modes. Single mode fibers are therefore better at retaining the fidelity of each light pulse over long distances than multi-mode fibers. Furthermore, for these reasons, single-mode fibers can have a higher bandwidth than multi-mode fibers.

According to a further aspect of the invention, the light guides may be cast in the blade structure. This may be very advantageous because the light guide then is protected from external influences, both mechanical (e.g. twists or pulls) and chemical (e.g. water or solvents). Furthermore, when the light guides are cast in the blade structure, the light guides would not be of any inconveniences to the service personnel. Hence, the risk of damaging the light guide when, e.g., a sensor or other equipment has to be maintained or replaced in the blade is eliminated.

According to an even further aspect of the invention, in the production of wind turbine blades, if the light guides are cast in the blade structure, a larger uniformity between each individually produced blade could be obtained. This could, e.g., ease calculations on the optical fibers etc. because the length of the optical fibers in each blade is the same. Furthermore, the production of wind turbine blades may be optimized because of light guides in a desired predetermined length could be provided.

The invention also relates to a wind turbine comprising at least one wind turbine blade and a method for manufacturing a wind turbine blade according to the above, where the method further comprises the steps of: partly establishing a wind turbine blade, integrating one or more electric powered modules with power supply means in the blade structure where the energy source is light beams, establishing the possibility of light beam transmission in the blade structure and/or in the blade interior from an external light source to the power supply means, and completing the establishment of the wind turbine blade.

Hereby are further advantageous embodiments of the invention achieved.

BRIEF DESCRIPTION OF THE DRAWINGS

The invention will be described in the following with reference to the figures in which.

DETAILED DESCRIPTION

Figure 1:
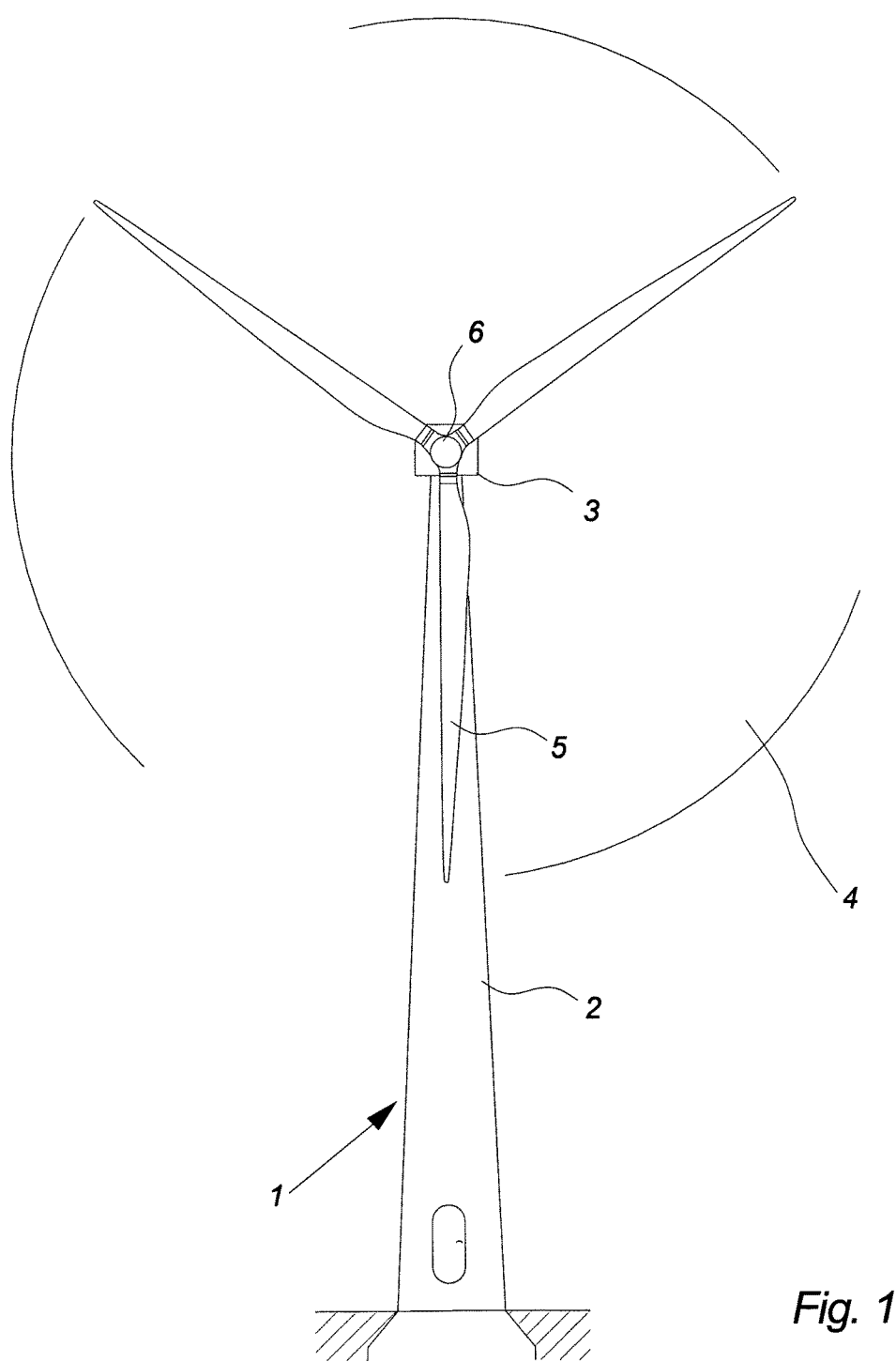
FIG. 1 illustrates a large modern wind turbine.

FIG. 1 illustrates a wind turbine 1, comprising a tower 2 and a wind turbine nacelle 3 positioned on top of the tower 2. The wind turbine rotor 4 comprises at least one wind turbine blade, e.g., three wind turbine blades 5 as illustrated in the figure. The rotor is mounted on a hub 6, which is connected to the nacelle 3 through the low speed shaft extending out of the nacelle front.

Figure 2:
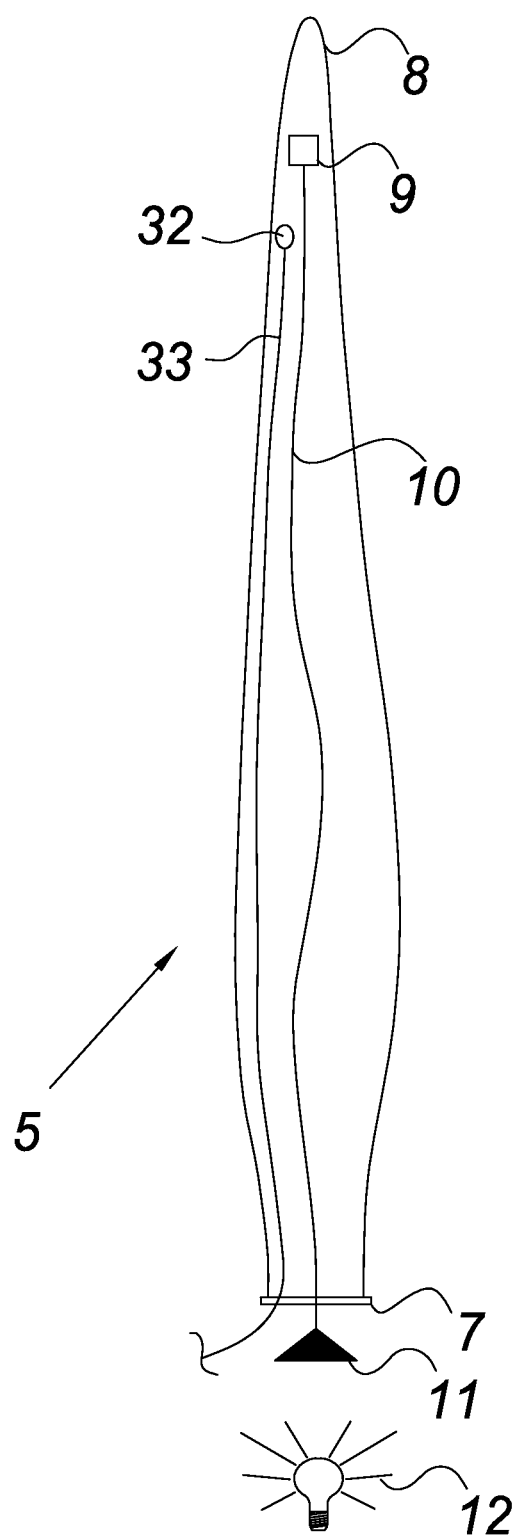
FIG. 2 illustrates schematically a wind turbine blade according to the invention.

FIG. 2 illustrates schematically a wind turbine blade according to the invention.

The figure especially illustrates the optical fibre connection 10 between a light source 12 positioned outside the wind turbine blade 5 and an electric powered module 9 positioned in or inside the wind turbine blade 5. At least one lightning receptor 32 may be included as part of the wind turbine blade 5 and disposed proximate to a tip 8 of the wind turbine blade 5. The at least one lightning receptor 32 may be electrically connected to a lightning down conductor 33 which may extend from the root 7 of the wind turbine blade 5 to the at least one lightning receptor 32.

The light source 12 may, for example, be positioned in the hub 6 or in the nacelle 3 (not illustrated in the figure) and facing one end 11 of the optical fibre 10. The light source may be any kind of light source with the possibility of emitting light of a certain and defined power density, e.g., a high power Xenon lamp or a laser source.

The optical fibre (or plurality of fibres) 10 may be integrated in the blade structure or positioned in the interior of the wind turbine blade. See FIG. 6 for non-limiting implementing methods of the optical fibre 10 integrated in the blade structure or in the interior of the wind turbine blade 5. As illustrated, the fibre extends from the root 7 of the blade to any location in the blade of the electric powered module 9, e.g., in proximity of the blade tip 8.

Figure 3:
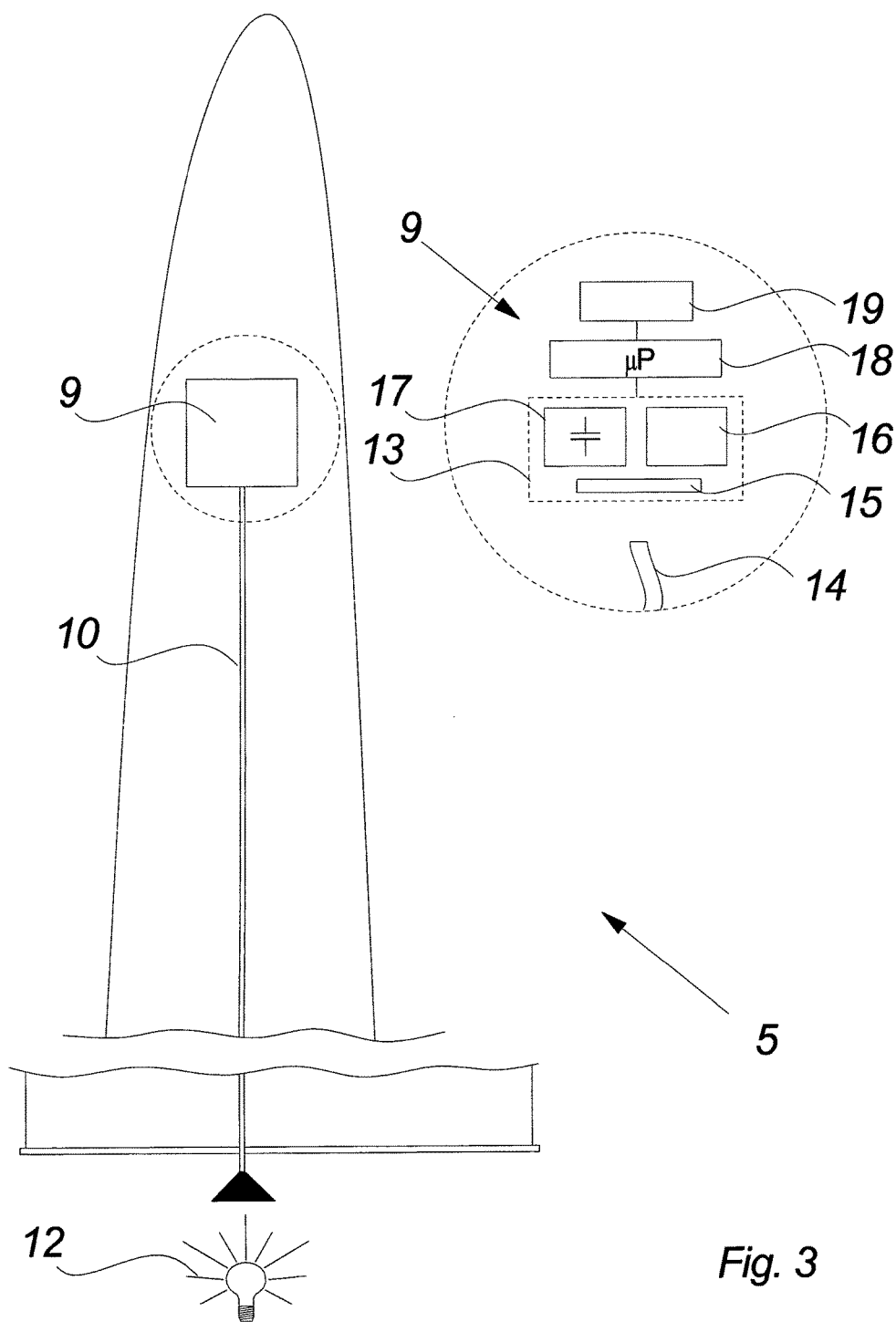
FIG. 3 illustrates an embodiment of power supply means for an electric powered module such as a sensor in a wind turbine blade according to the invention.

FIG. 3 illustrates an embodiment of a power supply means 13 for an electric powered module 9 such as a sensor in a wind turbine blade according to the invention.

As illustrated in the enlarged part of the figure, the power supply means 13 especially comprises a photovoltaic cell 15 for converting light beams to electrical power. The light beams are emitted from the optical fibre end 14 facing the power supply means wherein the optical fibre end is final part of the optical fibre 10, preferably stretching from the light source 12 in the hub or another part of the wind turbine outside the blade 5.

Further, the power supply means 13 may comprise a power supply part 16 for controlling the electric power of the photovoltaic cell 15 as well as storage means 17 for electrical power such as one or more capacitors.

Figure 4:
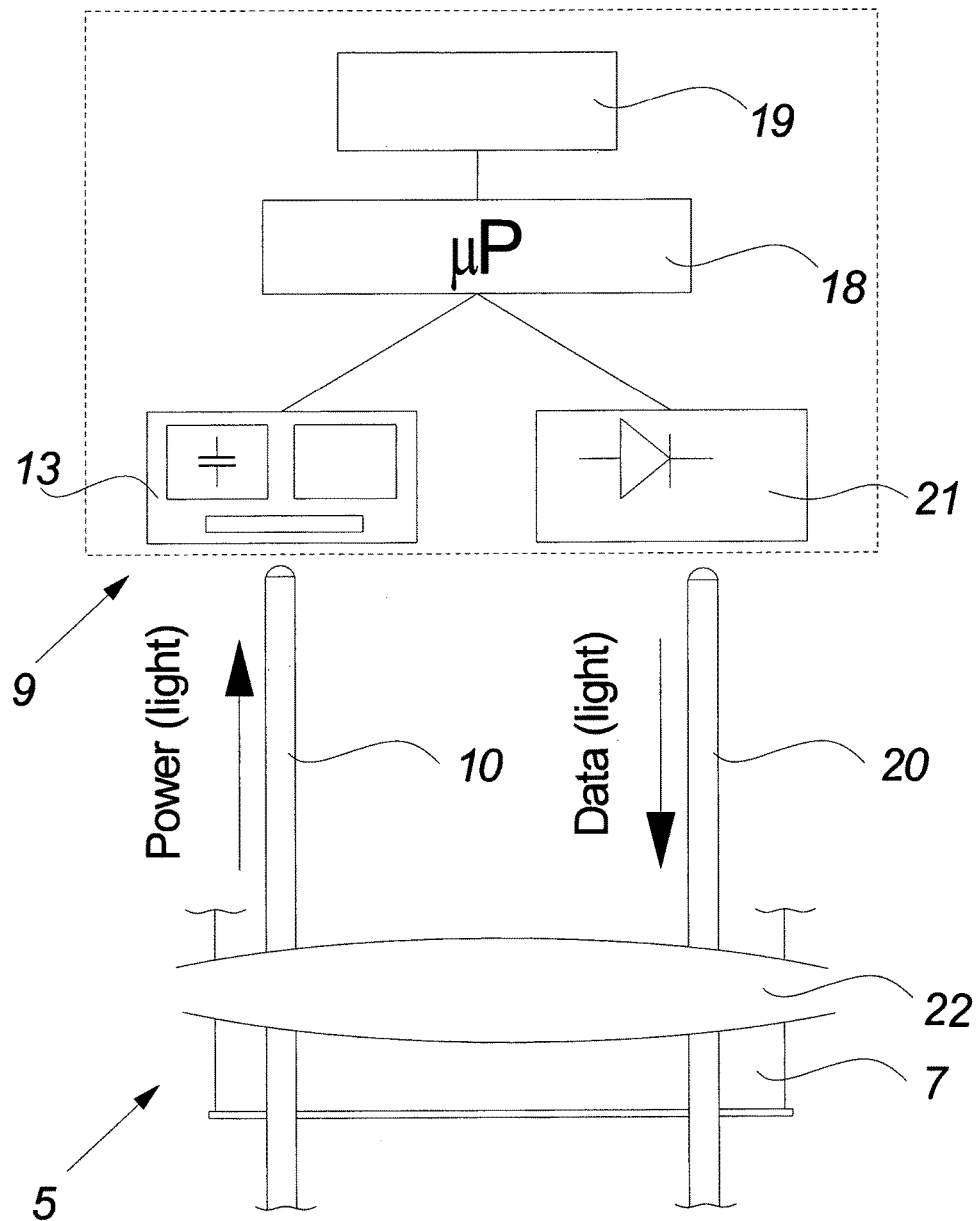
FIG. 4 illustrates a more detailed embodiment of an electric powered module in a sensor application of a wind turbine blade according to the invention.

FIG. 4 illustrates a more detailed embodiment of an electric powered module 9 in a sensor application.

The sensor module comprises power supply means 13, e.g., as explained above, having light beams emitted from an optical fibre 10, to an included photovoltaic cell, which is further illustrated by the arrow and "Power (light)". The converted electric power is supplied to a microprocessor means 18 such as an ultra low power microprocessor. The microprocessor also receives and controls electric signals from a sensor part 19 of the electric powered module 9. The signals are transferred by the microprocessor to a light source 21 in the module, which converts the signals to optical data communication for an optical fibre 20 illustrated by the arrow and "Data (light)."

The data communication is transferred to processing means positioned in other parts of the wind turbine or even outside the wind turbine, e.g., via a SCADA connection to a control center.

By the optical fibre connections 10, 20 is established a galvanic separation 22 between the electric powered module 9 and any ground potential outside the wind turbine blade which is schematically indicated at the reference number 22.

The optical fibres 10, 20 illustrated on FIG. 4 are only to illustrate that one or more optical fibres connect the electric powered module 9 with the other parts in or outside the wind turbine. It should be noted that in relation to all embodiments of the present invention, different combinations of use of one or more optical fibre are available. Hence as illustrated on FIG. 4, one optical fibre 10 is used for power up and/or upstream communication and one optical fibre 20 is used for downstream communication relative to the electrical powered module 9.

Beside or in combination with the illustrated embodiment on FIG. 4, the following examples are just to indicate that a plurality of different solutions could be used according to the scope of the invention.

In a not illustrated embodiment of the invention, one optical fibre is used for power (power up) to the electrical powered module 9 and two further optical fibres are used for full duplex communication between the electrical powered module 9 and other parts in or outside the wind turbine.

In a further not illustrated embodiment of the invention, one optical fibre is used for power (power up) to the electrical powered module 9 and one further optical fibre is used for bi-directional (half duplex) communication between the electrical powered module 9 and other parts in or outside the wind turbine.

Hence, as described, any combination of the number optical fibres and the use of the optical fibres is possible within the scope of the invention, even having only one optical fibre between the electrical powered module 9 and other parts in or outside the wind turbine.

Figure 5:
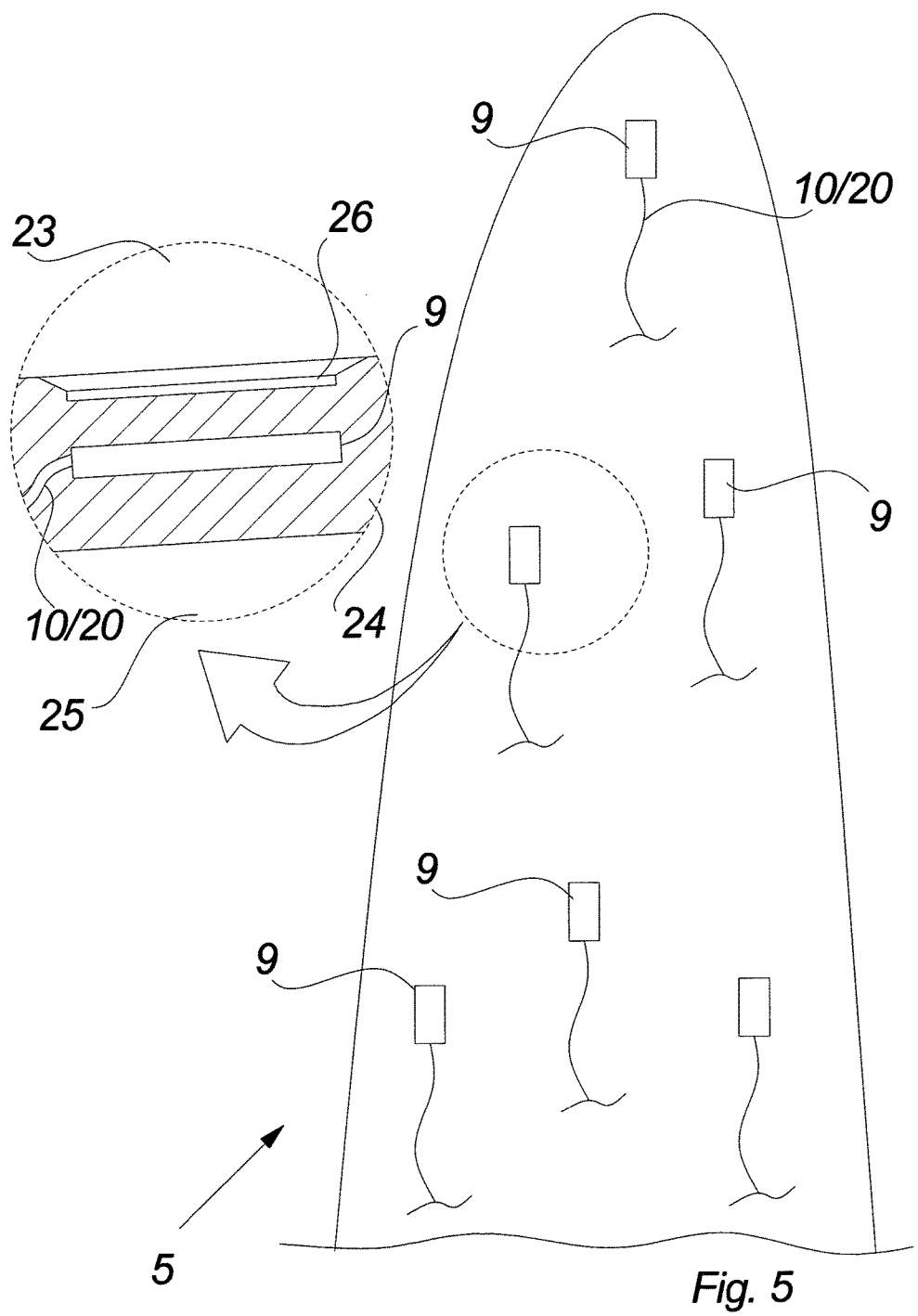
FIG. 5 illustrates schematically a wind turbine blade according to the invention with a plurality of electric powered modules implemented.

FIG. 5 illustrates schematically a wind turbine blade according to the invention with a plurality of electric powered modules 9 implemented.

The plurality of electric powered modules 9 may be sensors scattered over the full length of the wind turbine blade or concentrated in parts of the blade with an increased risk of strain or damage to the blade, e.g., the wind turbine tip. Further, sensors in a blade part may sense the same type of information, e.g., vibrations, and hereby establish a redundancy by the high number of sensors.

As illustrated in the enlarged part of the figure, the electric powered module 9 may be integrated in the blade structure 24, e.g., the blade shell or beam structure.

The integration may be established as part of the blade manufacturing method, e.g., by being positioned between the glass or carbon fibre material mats when they are applied in the blade manufacturing.

The invention described has been exemplified above with reference to specific examples. However, it should be understood that the invention is not limited to the particular examples, but may be designed and altered in a multitude of varieties within the scope of the invention as specified in the claims, e.g., with different data and/or power connections between a plurality of modules such as a cascade connection. Further, the power supply means may be positioned in another location within the wind turbine blade instead of being an integrated part of the module, e.g., in close proximity of the module, but not integrated in the module. Even further, the power supply means may be combined with local electric power sources such as one or more solar cells 26 integrated in the blade structure 24 beneath a fully or partly transparent cover material, as illustrated in FIG. 5, or kinetic energy sources in the blade.

As mentioned, it is possible to include a further energy source to support or backup the supply from the optical fibre 10. Beside the mentioned technologies also, e.g., electrochemical technologies such as, e.g., batteries, could be used. By implementing such rechargeable energy storages the optical fibres 10 may be supplemented, hence, when, e.g., a solar cell is able to provide more energy than, e.g., the micro processor has to use, the solar cell may charge one or more batteries.

Figure 6:
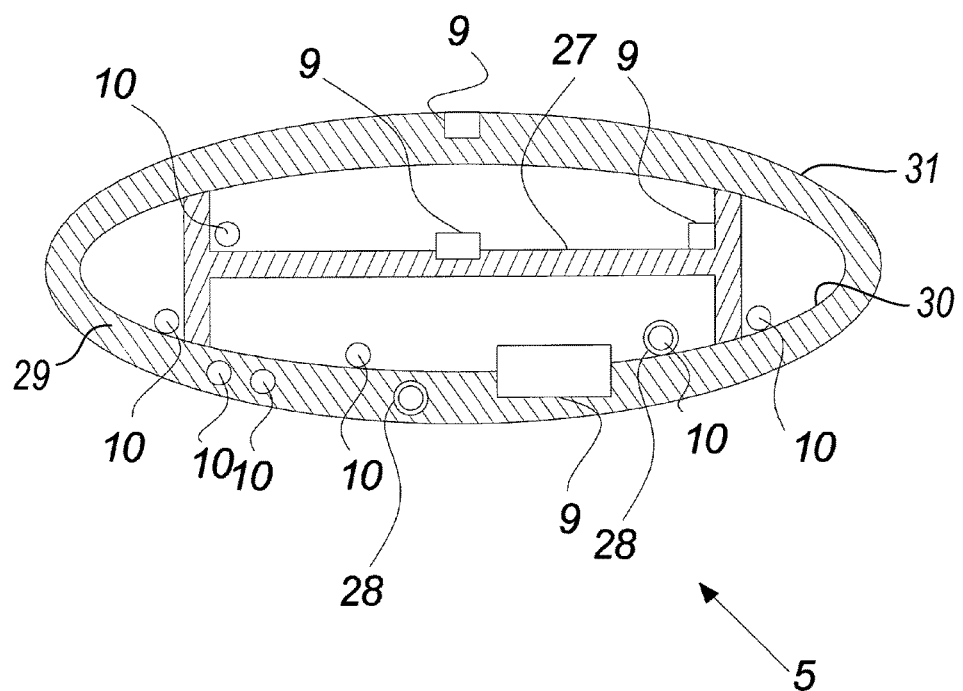
FIG. 6 illustrates a cross sectional view of a wind turbine blade with illustrating different solutions of integrating optical fibres and power electrical modules.

FIG. 6 illustrates a cross view of a wind turbine blade 5 illustrating examples of how optical fibres 10 and or one or more electric powered modules 9 may be integrated in wind turbine blade 5.

The integration of one or more optical fibres 10 and/or one or more electric powered modules 9, in the blade structure 29, could, e.g., be interpreted as the one or more optical fibres 10 and/or one or more electric powered modules 9 is, at least partly casted in the material constituting the wind turbine blade 5.

The blade structure 29 is defined between a most inner part 30 and a most outer part 31 of the wind turbine blade 5.

The wind turbine blade 5 may, e.g., be built up layer-wise and hence between the most outer 31 and the most inner layer/part 30 the optical fibre 10 or the one or more electric powered modules 9 may by located. It should be noted that it is not necessary to fully cast the electric powered modules 9 and the optical fibre 10 into the wind turbine blade 5.

The wind turbine blade 5 may, e.g., be made based on variations on glass-fiber reinforced polymer composite, carbon, wood or preferably epoxy based composites which may lead to shorter curing time than using other traditional resins, which is also possible.

As illustrated, the electric powered modules 9 may be integrated in the wind turbine blade 5 in a way where the electric powered modules 9 are partly located in the structure of the wind turbine blade 5 and partly located in the interior of the wind turbine blade 5.

According to an aspect of the invention, a tube 28 could also be cast in the wind turbine blade structure 29. Hence, after the wind turbine blade 5 is cast, it is possible to drag one or more optical fibres 10 through the tube 28. This could be an advantage if the optical fibre 10 is to be changed when the wind turbine 1 is put into operation.

Of course, such tube may be located elsewhere in the wind turbine blade 5. One example of such location is in the interior of the blade 5. A further example (not shown) is, if the construction of the blade 5 allows this, to locate the tube in a cavity within the material of which the blade 5 is constructed. It should be noted that in such cavity, also light guides, such as optical fibres 10, could be located.

As mentioned above, the optical fibre 10 may also, according to an embodiment of the invention, be positioned in the interior of the wind turbine blade 5. According to such embodiment, it may also be possible to remove and replace the optical fibres 10 after the wind turbine blade 5 is cast.

According to the above, care should be taken when choosing the type of optical fibre 10 because of the environment present inside and in relation to a wind turbine blade 5. The optical fibre (or plurality of optical fibres) may, e.g., be exposed to vibrations, change in temperatures, pressure and humidity, etc.

Furthermore, the route (cast in the blade in form of, e.g., a tube or in the interior of the blade) of the optical fibre has to be considered carefully. Because of the long term effect of the mentioned factors in relation to the environment in and in relation to wind turbine.

It should be noted that the wind turbine blade 5 may be provided with an internal support structure 27 as indicated on FIG. 6. The form or shape of the internal support structure 27 may vary, but the internal support structure 27 may be used in relation to the integration of the optical fibre 10 and/or the one or more electric powered modules 9.

It is possible to integrate more than one optical fibre 10 if needed. Having more than one fibre allows separating supply and data communication, and if one of the optical fibres is damaged, this does not have to have any effect since another optical fibre then can be used.

Throughout this document, the term optical fibres 10 has been used to describe the means for transporting energy optically to the electric powered modules 9. It should be noted that optical fibres are just a preferred embodiment of an optical waveguide (also referred to as light guide). An optical waveguide includes, when appropriate, but is not limited to, glass, plastics or polymers, mirrors, crystals etc.

In alternative embodiments of the invention, the optical energy may be transferred to the electric powered module 9 only by means of a laser beam. This embodiment would require some calibration or adjusting means, electrically or optically, to ensure that the laser beam is received so that the energy of the laser beam is used optimally. Such calibration or adjusting could e.g. be one or more optical lenses, mirrors, prisms, etc. and be located somewhere in between the source and receiver or at the source or receiver.

In a further alternatively embodiment of the invention, the optical energy may be transferred to the electric powered module 9 only by means of a laser beam directed from the source to the receiver by means of one or more mirrors. Such mirrors may, according to an embodiment of the invention, be movable.

In relation to the above mentioned examples of routing tubes 28 and/or optical fibres 10 inside a wind turbine blade, it should be noted that the tubes 28 and/or optical fibres 10 may be fastened. Such fastening could preferably be made by means of an adhesive material such as, e.g., glue, paste, etc., but also mechanical fastening means such as, e.g., clips or buoys may be used. The fastening may advantageously be performed at least partly along the length of the optical fibre 10.

LIST

1. Wind turbine
2. Wind turbine tower
3. Wind turbine nacelle
4. Wind turbine rotor
5. Wind turbine blade
6. Wind turbine hub
7. Root section of the wind turbine blade including the hub connection flange
8. Tip section of the wind turbine blade
9. Electric powered modules
10. Optical fibre for transmission of light beams for power supply
11. Optical fibre end facing a light source positioned outside the wind turbine blade, e.g., in the hub
12. Light source transmitting light beams as an energy source
13. Power supply means
14. Optical fibre end facing the power supply means
15. Photovoltaic cell for converting light beams to electrical power
16. Power supply
17. Storage means for electrical power such as one or more capacitors
18. Microprocessor means (μP) such as ultra low power microprocessor
19. Sensor part of the electric powered module
20. Optical fibre for at least data communication
21. Light source for optical data communication from the electric powered module
22. Galvanic separation (schematically illustrated) between the electric powered module and any ground potential
23. Exterior of the wind turbine blade
24. Wind turbine blade structure, e.g., a blade shell or beam
25. Interior of the wind turbine blade
26. Solar cell and partly or fully transparent blade surface layer
27. Internal support structure of the wind turbine blade
28. Tube
29. Wind turbine blade structure
30. Most inner part of the wind turbine blade
31. Most outer part of the wind turbine blade.

What is claimed is:

1. A wind turbine blade for use in a wind turbine, the wind turbine blade comprising:

a blade body comprising:
  a lightning protection system having a lightning down conductor configured to couple with an electrical ground through one or more other components of the wind turbine; and
  a routing tube extending substantially along a length of the blade body, wherein the routing tube is one of (i) integrated into the blade body, and (ii) fastened to an interior surface of the blade body;
at least one electric-powered module coupled with the blade body and comprising a device requiring electrical power to operate;
a power supply configured to generate, using converted light energy, the electrical power for operating the device; and
an optical waveguide extending through the routing tube and coupled to the power supply, the optical waveguide configured to receive light energy from a light source external to the blade body, and to transmit light energy to the power supply,
wherein a galvanic separation is formed between the at least one electric-powered module and the electrical ground to mitigate a risk of current from lightning strikes from being conducted to the electrical ground through the at least one electric-powered module.

2. The wind turbine blade according to claim 1, wherein the at least one electric-powered module includes one or more sensors.

3. The wind turbine blade according to claim 1, wherein the at least one electric-powered module is integrated in the blade body, wherein the electric-powered module is surrounded by an electrically conductive mesh or casing to provide electromagnetic compatibility (EMC) protection.

4. The wind turbine blade according to claim 1, wherein the optical waveguide includes at least one optical fiber.

5. The wind turbine blade according to claim 1, wherein the power supply includes at least one photovoltaic cell.

6. The wind turbine blade according to claim 5, wherein the at least one photovoltaic cell receives the light energy from at least one optical fiber.

7. The wind turbine blade according to claim 6, wherein the at least one optical fiber is integrated in the blade body.

8. The wind turbine blade according to claim 1, wherein the power supply is configured to generate the electrical power using energy from at least one of:
  one or more solar cells on a surface of the blade body or integrated in the blade body beneath a fully or partly transparent cover material: and
  kinetic energy sources in the blade body.

9. The wind turbine blade according to claim 1, wherein the at least one electric-powered module is positioned in an outer half of the blade body.

10. The wind turbine blade according to claim 1, wherein the at least one electric-powered module comprises a microprocessor.

11. The wind turbine blade according to claim 1, wherein the electrical power for the device is generated solely by the converted light energy.

12. The wind turbine blade according to claim 1, wherein the at least one electric-powered module includes a storage means for electric power.

13. A wind turbine comprising:
a tower; and
at least one wind turbine blade supported by the tower, each of the at least one wind turbine blade comprising:
  a blade body comprising:
    a lightning protection system having a lightning down conductor configured to couple with an electrical ground via the tower; and
    a routing tube extending substantially along a length of the blade body, wherein the routing tube is one of (i) integrated into the blade body, and (ii) fastened to an interior surface of the blade body;
  at least one electric-powered module coupled with the blade body and comprising a device requiring electrical power to operate;
  a power supply configured to generate, using converted light energy, the electrical power for operating the device; an optical waveguide extending through the routing tube and coupled to the power supply, the optical waveguide configured to receive light energy from a light source disposed external to the blade body, and to transmit light energy to the power supply,
wherein a galvanic separation is formed between the at least one electric-powered module and the electrical ground to mitigate a risk of current from lightning strikes from being conducted to the electrical ground through the at least one electric-powered module.

14. A method, comprising:
establishing a blade body of at least one wind turbine blade with:
  a lightning protection system having a lightning down conductor configured to couple with an electrical ground when the at least one wind turbine blade is installed on a wind turbine; and
  a routing tube extending substantially along a length of the blade body, wherein the routing tube is one of (i) integrated into the blade body, and (ii) fastened to an interior surface of the blade body;
integrating one or more electric-powered modules with a power supply in the blade body, the one or more electric-powered modules comprising a device requiring electrical power to operate, the power supply configured to generate, using converted light energy, the electrical power for operating the one or more electric-powered modules; and
inserting an optical waveguide through the routing tube to couple to the power supply, the optical waveguide configured to receive light energy from a light source disposed external to the blade body, and to transmit light energy to the power supply,
wherein a galvanic separation is formed between the one or more electric-powered modules and the electrical ground to mitigate a risk of current from lightning strikes from being conducted to the electrical ground through the one or more electric-powered modules.

15. The method of claim 14, further comprising:
enclosing the one or more electric-powered modules inside an electrically conductive mesh or casing to provide electromagnetic compatibility (EMC) protection to the one or more electric-powered modules.

16. The method of claim 14, wherein inserting the optical waveguide includes installing at least one optical fiber.

17. The method of claim 14, further comprising:
installing the at least one wind turbine blade onto a tower of the wind turbine;
providing the light energy from the light source through the optical waveguide to the power supply; and
powering the device using solely the converted light energy.

* * * * *